June 28, 1960    E. V. HARDWAY, JR    2,942,456
ACCELERATION RESPONSIVE DEVICES
Filed Sept. 10, 1954

INVENTOR
Edward V. Hardway, Jr.

BY Stone, Boyden & Mack
ATTORNEYS.

United States Patent Office 2,942,456
Patented June 28, 1960

2,942,456
ACCELERATION RESPONSIVE DEVICES
Edward V. Hardway, Jr., Goochland County, Va., assignor, by mesne assignments, to Robertshaw-Fulton Controls Company, Richmond, Va., a corporation of Delaware Filed Sept. 10, 1954, Ser. No. 455,297
4 Claims. (Cl. 73—71)

This invention relates to acceleration responsive devices and particularly to such devices which may be constructed at unusually low cost and which are characterized by accurate, repeatable response over a wide range of vibratory frequencies and acceleration values.

There has long been a need for a dependable acceleration responsive device with a mechanical output suitable for acceleration measurement and the actuation of switches or other control apparatus. In particular, users of turbines, compressors, jet engines, automatic machine tools, and the like require some automatic means for actuating a warning system or shutting down a machine when excess vibration occurs. The problem is of particular importance when unattended machines of great value are involved. Failure to detect an increase in vibration may frequently result in costly damage or, in some instances, loss of life. An example of the latter is that of detecting excess jet engine vibration on aircraft in flight.

In the past, numerous acceleration responsive systems have been proposed for such applications. The most widely used combinations employ some form of pickup or transducer for continuously sensing the vibratory velocity or acceleration, a high-gain amplifier, and a relay or some type of indicating or recording device. Such systems are complicated, very expensive, and frequently require more maintenance than the equipment they are installed to protect. Velocity and acceleration transducers for vibration measurements all require some degree of relative motion between the instrument case and the mass or inertial element to function. This requirement imposes severe limitations on the frequency response and limits the energy converted necessitating high gain amplification of the electrical output. Such limitations appear unavoidable in research applications where the entire vibration wave form is of interest, but they severely restrict the applicability of such equipment to extensive industrial use.

An object of the present invention is to provide an improved acceleration responsive device for use in vibration measuring and protective devices which responds to slowly varying or high frequency vibratory acceleration in a predetermined, precise, and repeatable fashion over a wide range of levels.

Another object is to provide a low cost acceleration responsive device not requiring the use of amplifiers, special power supplies or other expensive auxiliary components requiring frequent maintenance.

A further object is to provide acceleration responsive means readily adaptable for direct mechanical actuation of electrical switches, valves, visual signals, sounding devices, and the like.

In general, acceleration responsive devices constructed in accordance with the invention involve a support, such as a case, an inertia unit and a magnetic couple comprising a permanent magnet and a magnetically soft body (or a second permanent magnet). One element of the couple is rigidly fixed to the inertia unit and the other element to the support. The inertia unit is attached to the support by mounting means which coacts with the magnetic couple to initially restrain the inertia unit against any motion relative to the support when the magnetic couple is engaged. This mounting means accurately locates the relative position of engagement of the elements of the magnetic couple and constrains the inertia unit to one degree of freedom in movement of the inertia unit relative to the support when the magnetic couple is disengaged. Adjustable biasing means is provided to apply to the inertia unit a biasing force tending to disengage the magnetic couple.

When the magnetic couple is engaged, the inertia unit is constrained to move with the support and thus is subject to the same acceleration as is the support regardless of the frequency, rate of change, or amplitude of such acceleration. The setting of the adjustable biasing means determines the particular acceleration level which will be effective to cause disengagement of the magnetic couple. Thus, near the actuating point, the forces involved are nearly in balance, yet all components of the device including the inertia unit and the support move together as a rigid unit. Occurrence of the predetermined acceleration level selected by adjustment of the biasing means causes the inertial and biasing forces to exceed the restraining force of the magnetic couple so that a slight gap or increase in gap occurs in the flux path of the magnetic means which, in turn, causes a large unbalance of forces affecting the inertia unit, resulting in disengagement of the magnetic couple. Upon such disengagement the substantial potential energy available from the biasing means is released and may be used to actuate a switch or other device.

Particular attention must be given to maintaining the entire structure as a rigid unit until the selected acceleration level occurs. The mounting means for the inertia unit and the magnetic couple are arranged to insure an identical condition of engagement of the magnetic couple after each operation so that no change will occur in the restraining force of the magnetic couple during engagement or between successive engagements. The mounting means should be constructed so as to allow only one degree of freedom of the inertia unit in motion near the point of engagement of the magnetic couple and in a direction to engage or disengage the couple. It should allow substantially no motion in any other direction. Attention must be given to the reduction of compliance in the support, mounting means, magnetic means, and inertia unit to prevent vibratory modes of resonance in the desired useful frequency range, or sensitivity changes resulting from flexure. I have found that by fulfilling the above requirements precise results may be obtained over a wide frequency range using relatively inexpensive components, and that the biasing means may be calibrated to enable the user to quantitatively select the acceleration level for operation of the device or quantitatively determine the level of an unknown acceleration.

In order that the invention may be understood in detail, reference is made to the accompanying drawings which form a part of this specification and wherein.

Figure 1:
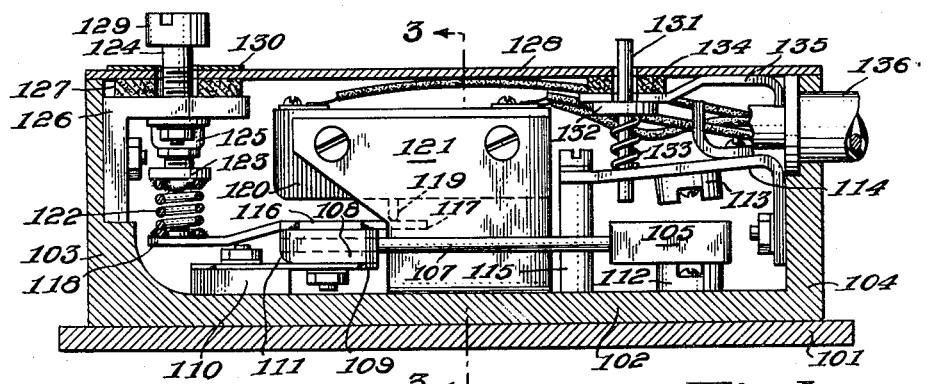
Fig. 1 is a side elevational view, partly in vertical section, of a preferred embodiment of the invention.
Figure 2:
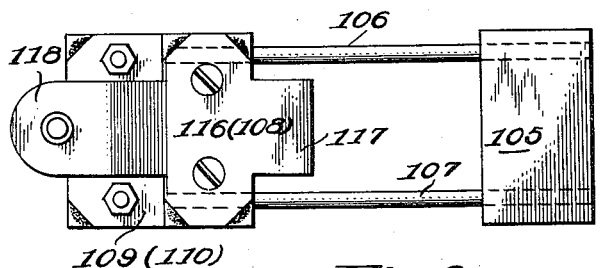
Fig. 2 is a plan view of the inertia unit and its mounting means, employed in the device of Fig. 1.
Figure 3:
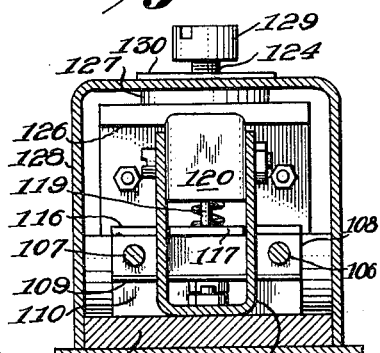
Fig. 3 is a vertical sectional view taken on line 3—3 Fig. 1.

Referring now to the drawings in detail, it will be seen that the embodiment of the invention shown in Figs. 1–5 comprises a base 101 to which is rigidly connected a support including a base member 102 and end plates 103 and 104.

The inertia unit of this embodiment comprises a member 105 fabricated of magnetically soft material and constituting a material mass. Member 105 is telescoped over and rigidly secured to linking means comprising spaced parallel shafts 106 and 107. The inertia unit is mounted by means of a substantially frictionless pivot including a flat sheet-like element which may take the form of a leaf spring 109 to the opposite faces of which are rigidly secured blocks 108 and 110, the blocks being offset one from the other and having their adjacent corners in substantial alignment. Preferably, the adjacent corner portions of the blocks 108 and 110 are slightly overlapped, as shown, and the corner of block 108 nearest block 110 is rounded, as seen at 111, in order to provide for rocking motion relative to spring 109. Shafts 106 and 107 extend through and are rigidly secured to the upper block 108, so that block 108 is included in the inertia unit. Lower block 110 is securely bolted to base member 102, as shown.

Disposed beneath member 105, with pole faces upward, and rigidly secured to base member 102 is a permanent magnet 112 which coacts with member 105 to form a magnetic couple. A second permanent magnet 113, disposed above block 105 with its pole faces facing the same, is rigidly secured to a bracket 114 bolted at one end to upright 104 and at the other end a pin 115 extending upwardly from the member 102. It will be noted that the inertia member 105 is free to move in a plane substantially at right angles to base plate 101 between magnets 112 and 113, but is restrained against movement in any other direction.

Rigidly secured to the top face of mounting block 108 is a substantially inflexible metal plate 116 having a forward extension 117 and a rearward extension 118. Extension 117 engages the tip of reciprocable operating pin 119 of a conventional snap switch 120. The switch 120 is mounted between shafts 106 and 107 by means of a U-shaped bracket 121 bolted to member 102.

Figure 4:
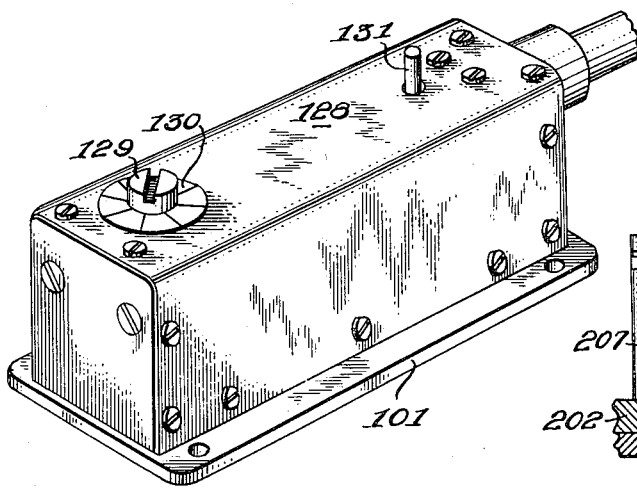
Fig. 4 is a perspective view, reduced in scale, of the device of Fig. 1.

The moving system of the device is biased by means of a coil spring 122 having its lower end rigidly fixed, as by soldering, to extension 118. Spring 122 should preferably be of fully hard beryllium-copper wire or equivalent high quality spring material substantially free from drift and hysteresis within the working range of the spring. The upper end of spring 122 is rigidly secured to a cup 123 in which is journalled the free end of an adjusting screw 124. The adjusting screw is threaded into a suitable lock nut 125 rigidly fixed to a mounting bracket 126 attached to upright 103. A felt washer 127 is disposed between the upper surface of bracket 126 and the top of a casing member 128 which encloses the operating mechanism of the device. The exposed end of adjusting screw 124 is provided with a head 129 which, as seen in Fig. 4, is provided with a screw driver slot which serves as a suitable pointer for cooperation with a calibrated dial 130.

With inertia member 105 in engagement with the pole faces of permanent magnet 112, head 129 may be rotated to adjust the compression of spring 122, so applying a downwardly acting biasing force on extension 118 and tending to rotate the block 108 in a sense biasing the inertia unit away from magnet 112 toward magnet 113. Upon occurrence of a predetermined case acceleration, selected by adjustment of the compression of spring 122, ferromagnetic inertia element 105 will be freed from magnet 112 and pivoted upwardly into contact with latching magnet 113. Such pivotal motion will cause actuation of switch 120 by reason of pressure applied to actuating element 119 by extension 117 of plate 116. Since spring 122 now aids the force applied by magnet 113, the device will now be held against further operation.

In order to reset the device by pivoting the inertia unit downwardly toward magnet 112 and so re-engaging the magnetic couple, I provide a reciprocating plunger 131 having a collar 132 engaging a coil spring 133 supported by bracket 114. Spring 133 normally urges plunger 131 upwardly so that the upper end thereof is exposed exterior of the casing, as shown. Upon depression, against the force of spring 133, the lower end of plunger 131 engages inertia member 105 to pivot the same downwardly into engagement with magnet 112. In order to seal the opening in casing 128 which accommodates the plunger, I provide a felt washer 134, as shown. A suitable bracket 135 is provided to position washer 134, to act as a stop for collar 132, and to aid in positioning the inner end of electrical cable 136. The conductors of cable 136 are led to switch 120 and connected thereto in conventional manner.

It is essential that all mountings and connections in the apparatus be rigid so that the parts are held against any movement other than the one degree of freedom in motion allowed the inertia unit. Thus, shafts 106 and 107 are secured to members 105 and 108, the ends of the shafts extending entirely through suitable close-fitting bores in those members and being expanded into firm engagement with said bores. Similarly, blocks 108 and 110 are attached to leaf spring 109 by means of machine screws or the like, and the corners of the leaf spring are then soldered to the adjacent surfaces of the blocks. Both ends of spring 122 are soldered to elements 118 and 123, respectively, so that the spring may not shift laterally. Members 102 and 128 are rigidly secured by means of closely spaced machine screws. When the device is constructed in this manner, and inertia unit 105 is in engagement with magnet 112, any acceleration effecting the case will be imparted to the inertia unit, and the inertia unit will be free from transitory vibratory motion which might arise from movement of other parts within the device.

Mounting means for the inertia unit, comprising blocks 108 and 110 and leaf spring 109 constitutes a substantially frictionless pivot capable of constraining the inertia unit to one degree of freedom in motion relative to the support, such movement being substantially perpendicular to the magnet pole faces. Since the adjacent corners of blocks 108 and 110 overlap, and since biasing spring 122 acts in a direction urging blocks 108 and 110 toward each other, it will be seen that this mounting means is free from any material tendency to shift with changing pressures resulting from adjustment of the device. The leaf spring 109 is maintained inflexible, except in a plane substantially normal to its major surfaces.

A vibration responsive switch constructed in accordance with Figs. 1–4 was tested on a vibration calibrator, the switch being adjusted to actuate at 1.0 G, actuation being effected at various frequencies ranging from 25 to 200 cycles per second. Results of such test are as follows:

| Frequency (cycles per second): | Acceleration at actuation point (in G's) |
|---|---|
| 25 | 0.97 |
| 50 | 1.00 |
| 100 | 1.00 |
| 200 | 1.00 |

It will thus be seen that the device exhibits essentially flat response within this frequency range. I have found that rigid restraint of the moving system of the device, except in the one degree of freedom in motion necessary for disengagement of the magnetic means, is essential if such flat response is to be obtained.

The body 105 is preferably of iron, ground flat, and plated to provide a thin surface coating of soft metal, preferably silver. Before final assembly, the contact surfaces between the inertia member 105 and the magnet 112 are "worn in" by maintaining a light face-to-face contact and vibrating at a relatively high frequency to provide a continuous chattering impact. In this manner, the flat mating faces of the paramagnetic body and the magnet are made to match each other as closely as possible so that the same magnetic force will result upon each engagement of the magnetic means. As hereinbefore pointed out, it is highly desirable to exclude all dust particles and the like from possible contact with the magnetic means. For this purpose, I provide the felt sealing washers 127 and 134 to prevent infiltration of dust and the like into the casing 128. It will be understood that the casing closely embraces the members 102, 103 and 104 and is secured thereto by closely spaced machine screws as shown in Fig. 4 so that a sealing contact is maintained between the casing and these members.

Acceleration responsive devices can be built in accordance with Figs. 1–4 to have a wide range of response. Thus, it is possible to obtain repeatably accurate response at acceleration levels as low as .01 G. Tests have been run on such devices at .05 G and 300 cycles per second, in which precise actuation was obtained with a vibratory amplitude as low as 5 microinches.

While I have shown the control device as a conventional snap switch, it will be understood that such device may be a conventional hydraulic valve or other suitable mechanism, in accordance with the purpose of the particular unit.

The invention is also adapted for use as a peak accelerometer either as shown or in simpler form without the switch 120, the operation being as described with reference to Figs. 1–4. For most applications, the impact caused by engagement of inertia member 105 with latching magnet 113, being clearly audible, serves as an indication that the predetermined acceleration has occurred. Where it is impractical to depend upon the sound made by actuation of the device, the casing 128 may be provided with a window to allow observation of the inertia unit.

Figure 5:
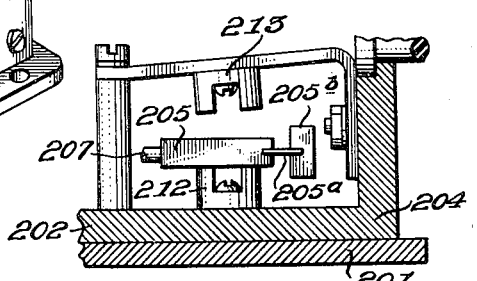
Fig. 5 is a detail view, in vertical section, of a modified embodiment of certain parts of the device of Fig. 1.

A modification of the device constructed for operation in response to acceleration at a given frequency is shown in Fig. 5. Here, the base 201, support 202, end member 204, shaft 207, inertia member 205, and magnets 212 and 213 are constructed and arranged in the same manner as the corresponding parts in Figs. 1–4, it being understood that the portion of the device not seen in Fig. 5 may be constructed in accordance with Figs. 1–4. Inertia element 205 is provided with an end slot in which is fixed one end of a leaf spring 205$^a$, the other end of the spring being fixed to an additional mass 205$^b$. The spring 205$^a$ and additional mass 205$^b$ constitute a resonant system for amplifying the force produced on the inertia unit by vibratory acceleration near the resonant frequency.

Thus, with ferromagnetic member 205 engaged with restraining magnet 212, the biasing means is adjusted to preselect a given magnitude of acceleration for actuation of the device. The resonant system comprising spring 205$^a$ and supplementary mass 205$^b$ allows the device to be relatively insensitive to vibratory acceleration at frequencies different from the resonant frequency of that system. Upon occurrence of the predetermined acceleration at the resonant frequency, the forces acting upon the inertia unit are unbalanced in a sense tending to move member 205 upwardly, the magnetic couple comprising member 205 and magnet 212 is disengaged, and the force of the biasing means as spring 122, Fig. 1, is effective to pivot the inertia unit upwardly to engage member 205 with latching magnet 213.

Referring to Fig. 1, it is evident that the motion of the inertia unit is angular about the pivot axis between blocks 110 and 111, rather than linear in character. But, because the total angular travel is small, the relations affecting sensitivity of the device may be treated on a linear basis involving mass, force and leverage ratios as well as in terms of moment of inertia and torque. The device of Fig. 1 is sensitive to the resultant vertical downward acceleration acting through a point to the right (as viewed) of the pivot and at a distance from the pivot equal to the radius of gyration. When most of the mass of the inertia unit is concentrated in member 105, this point will fall close to the center of gravity of member 105. When, on the other hand, the inertia unit is balanced by increasing the mass of lever 118 and decreasing the mass of member 105, the center of gravity may be made to fall at the pivot axis causing the device to be insensitive to linear acceleration. It may then be used as an angular accelerometer, sensitive only to angular acceleration about the pivot axis, the sensitivity being dependent on the moment of inertia of the inertia unit.

When the device is mounted in any given orientation on a machine, the gravitational component, which is equivalent to acceleration, is balanced out (while the machine is not running) by determining the setting of the adjustable biasing means at which the device will actuate while not being subjected to any material vibration. Measurements are then made away from this setting as a zero reference for vibratory acceleration. The sensitivity of the device to gravity, or response at zero frequency, adds utility to the device for such purpose as determining when an aircraft in flight has exceeded a predetermined safe G loading. Sensitivity to gravity also permits accurate calibration of the adjusting means by noting the difference in settings of the adjusting means necessary to actuate the device with the base plane (that is, the plane in which member 101 lies) vertical and with the base plane horizontal, this difference corresponding to an acceleration of 1 G. Here, acceleration in G's is defined as the linear acceleration divided by the acceleration of gravity.

The biasing means including spring 122, Fig. 1, serves to overcome both the restraining force of the magnetic couple and the weight of the inertia unit. To set for a given peak vibratory acceleration, the sensitivity of the adjusting means is related to the leverage ratios, the number of turns per inch of screw 124, the effective mass of the inertia unit including member 105 and the spring rate, which may be given in pounds per inch, of the spring 122. Sensitivity of the adjusting means is independent of the restraining force of the magnetic couple, which restraining force affects the zero reference setting and the spring energy available to move the inertia unit and actuate the switch operating pin 119, after the magnetic couple is disengaged. Thus, the spring rate, and the adjusting screw sensitivity are determined for the given mass of the inertia unit.

For example, in a device constructed in accordance with Fig. 1 employing a leverage ratio of 5:1, an adjusting screw of 32 threads per inch and an effective mass (at a point over the magnetic couple) of 0.079 pound, an additional spring force of 0.4 pound was required to balance the weight of the inertia unit. With the screw 124 providing a travel of 1/32 inch per turn of the screw, the corresponding spring rate to obtain an adjustment sensitivity of one revolution of adjusting knob 129 per G was 12.8 pounds per inch. The restraining force of the magnetic couple, however, was approximately 0.5 pound, or 2.5 pounds on the spring side of the lever, corresponding to a total spring deflection of 0.195 inch or about 6¼ turns of the adjusting screw. The relations between mass and the required spring rate for a given sensitivity may be calculated by similar methods for any given configuration of the device.

In the embodiment of Fig. 1, the magnetic couple is formed by permanent magnet 112 and inertia member 105. Magnet 112 is preferably of aluminum-nickel-cobalt-iron alloy ("Alnico"), while member 105 is of magnetically soft iron silver-plated to resist corrosion and provide a non-wearing impact-resistant surface. The thickness of the plating is equivalent, magnetically, to a small air gap which reduces the restraining force of the magnetic couple but, if sufficiently thin, does not affect satisfactory operation. An air gap may be purposely included to improve repeatability in embodiments of the device where dust particles, oil, etc., are apt to deposit on the contacting surfaces of the magnetic couple.

The permanent magnet may be mounted on the inertia unit if desired, the other member of the couple, being either a soft ferromagnetic body or a second permanent magnet, then being rigidly attached to the support. The magnetic couple should have all pole faces in a close flux linkage when engaged. It is essential that the separation, if any, of the ferromagnetic elements of the couple be precisely maintained for each successive engagement.

The embodiment of the invention seen in Fig. 1, including single-pole-double-throw snap switch 120, may be wired through cable 136 into warning, control, or indicating circuits to actuate a warning signal or shut down a machine when vibration exceeds a predetermined safe value. The zero setting is determined with the machine not running. The device is then reset and adjusted to actuate with the machine running normally, the normal vibration then being determined from the difference in the two settings on calibrated dial 130. Head 129 is then turned an additional amount in a direction decreasing the biasing force of spring 122, to provide a desired safety factor. Reset pin 131 is then depressed to re-engage the magnetic couple, the device thus being set to actuate whenever the machine is subjected to vibration in excess of the safety factor.

I claim:

1. In an acceleration responsive device, the combination of a base member; mounting means comprising a leaf spring and a pair of blocks rigidly secured to opposite faces of said spring and offset one from the other with adjacent corner portions of the two blocks slightly overlapped, one of said blocks being rigidly secured to said base member; a magnetic couple, a rigid inertia unit including the other of said blocks and one element of said magnetic couple, the other element of said magnetic couple being rigidly secured to said base member; a rigid lever fixed to said other block and extending away from said magnetic couple; resilient means acting on said lever and disposed to apply a biasing force thereto toward said base member and tending both to disengage said magnetic couple and to urge said blocks toward each other, and means for adjusting said resilient means to determine said biasing force and so predetermine the acceleration value effective to disengage said magnetic couple.

2. In an acceleration responsive device, the combination of a support; mounting means comprising a leaf spring and a pair of blocks rigidly fixed one to each face of said spring with adjacent corners of said blocks in substantial alignment, one of said blocks being rigidly secured to said support; a pair of spaced parallel shafts secured to the other of said blocks and extending above said support; an inertia element rigidly fixed to the ends of said shafts, said other block, said shafts and said element constituting a rigid inertia unit constrained by said mounting means to one degree of freedom in motion relative to said support; a ferromagnetic member fixed to said support and disposed to be engageable by said inertia element as a result of motion in said one degree of freedom, said ferromagnetic member and said inertia element constituting a magnetic couple; resilient means connected to said mounting means and disposed to apply a biasing force to the same in a direction tending to disengage said magnetic couple; and means for adjusting said resilient means to determine said biasing force and thus predetermine the acceleration value effective to disengage said magnetic couple.

3. In an acceleration responsive device, the combination of a support adapted to be mounted so as to be subject to acceleration, an inertial mass, means for mounting said mass on said support, said mounting means having a very high resistance to movement of the mass in all except one plane to permit only one degree of freedom of motion of the mass relative to the support, magnetic means operatively associated with said mass to exert a force thereon tending to hold the mass in a fixed position with respect to the support to cause the mass to move therewith, spring biasing means operatively associated with said mass to urge the mass away from said support with a force tending to cause motion in said plane in opposition to the action of said magnetic means, and means for adjusting said spring biasing means to determine its force and so predetermine the magnitude of acceleration of the support at which the mass will move away therefrom, a second mass and a spring, said second mass being supported from said first mass by said spring, said second mass and said spring constituting a resonant system responsive to a particular frequency to amplify the force applied to said first mass by acceleration of said support when said acceleration is at said particular frequency.

4. In an acceleration responsive device having a support and an inertia element with a magnetic couple exerting a force between said support and element; means for mounting said inertia element upon said support for pivotal movement in a single degree of freedom relative to said support, said means comprising a first block rigid with said frame, a flat sheet-like element having a portion rigidly secured to a surface of said first block and having a second portion projecting beyond an edge of said surface, a second block for carrying the inertia element and having a surface secured to the second portion of said flat element, said blocks being secured to opposite sides of said element and having parallel corner edges spaced only by the thickness of said element.

References Cited in the file of this patent

UNITED STATES PATENTS

| 1,288,128 | Murray | Dec. 17, 1918 |
| 1,400,229 | Murray | Dec. 13, 1921 |
| 2,065,594 | Lyman | Dec. 29, 1936 |
| 2,280,114 | Athy | Apr. 21, 1942 |
| 2,453,548 | Statham | Nov. 9, 1948 |
| 2,686,853 | Mathues | Aug. 17, 1954 |
| 2,731,526 | Teague et al. | Jan. 17, 1956 |
| 2,802,204 | Kennelly et al. | Aug. 6, 1957 |

FOREIGN PATENTS

| 446,230 | Great Britain | Apr. 27, 1936 |
| 625,511 | Great Britain | June 29, 1949 |